United States Patent [19]

Lorman et al.

[11] Patent Number: 5,169,316
[45] Date of Patent: Dec. 8, 1992

[54] SPEECH THERAPY DEVICE PROVIDING DIRECT VISUAL FEEDBACK

[76] Inventors: Janis S. Lorman, 1738 Gorge Pk Blvd., Stow, Ohio 44224; Cynthia L. Jones, 430 Silver Valley Blvd., Munroe Falls, Ohio 44262

[21] Appl. No.: 727,412

[22] Filed: Jul. 9, 1991

[51] Int. Cl.[5] ............................................. G09B 19/04
[52] U.S. Cl. .................................. 434/185; 434/178; 434/317; 428/912.2
[58] Field of Search ............... 434/185, 371, 416, 156, 434/317, 178, 112, 184; 446/147; 40/219; 428/912.2

[56] References Cited

U.S. PATENT DOCUMENTS

| | | | |
|---|---|---|---|
| 660,255 | 10/1900 | Kingma | 434/185 |
| 2,692,444 | 10/1954 | Lindsley | 434/185 |
| 3,148,461 | 9/1964 | Johnson | 434/185 |
| 4,218,836 | 8/1980 | Acres | 434/185 |
| 4,460,342 | 7/1984 | Mills | 434/185 |
| 4,768,959 | 9/1988 | Sprague et al. | 434/185 X |
| 5,015,179 | 5/1991 | Resnick | 434/185 |

FOREIGN PATENT DOCUMENTS 1378710 12/1974 United Kingdom ............... 434/185

OTHER PUBLICATIONS

Communication Skill Builders "1978 Fall/Winter Catalog", 1978, p. 13.
Modern Education Corporation "Special Education Catalog", 1974, p. 1.

Primary Examiner—Richard J. Apley
Assistant Examiner—Karen Jalbert
Attorney, Agent, or Firm—Oldham Oldham & Wilson, Co.

[57] ABSTRACT

A speech therapy device for providing a means for the treatment of speech and swallowing problems and disorders comprising a sheet having first and second surfaces with a centrally-affixed means for providing direct visual feedback, as well as instructions, guidelines and indicia placed strategically therearound for practicing basic oral exercise drills. The preferred visual feedback means is a mirror, particularly one comprised of an acrylic material. The sheet may be either a single flat sheet or folio prepared from a folded single sheet or multiple sheets.

11 Claims, 3 Drawing Sheets

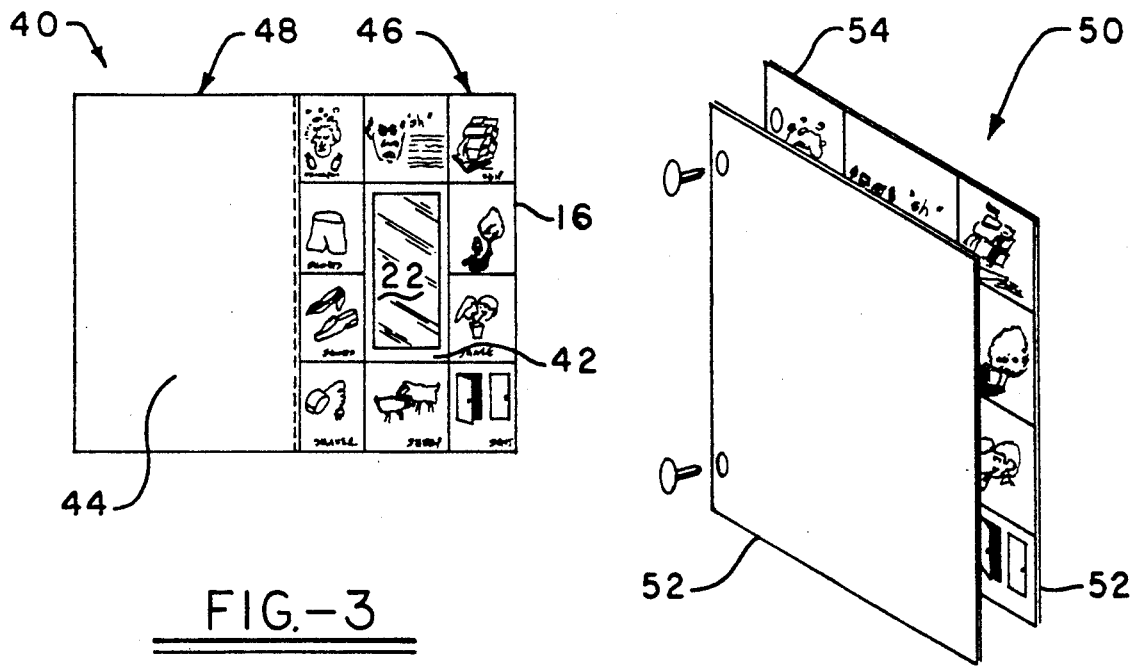
FIG.-3
FIG.-4
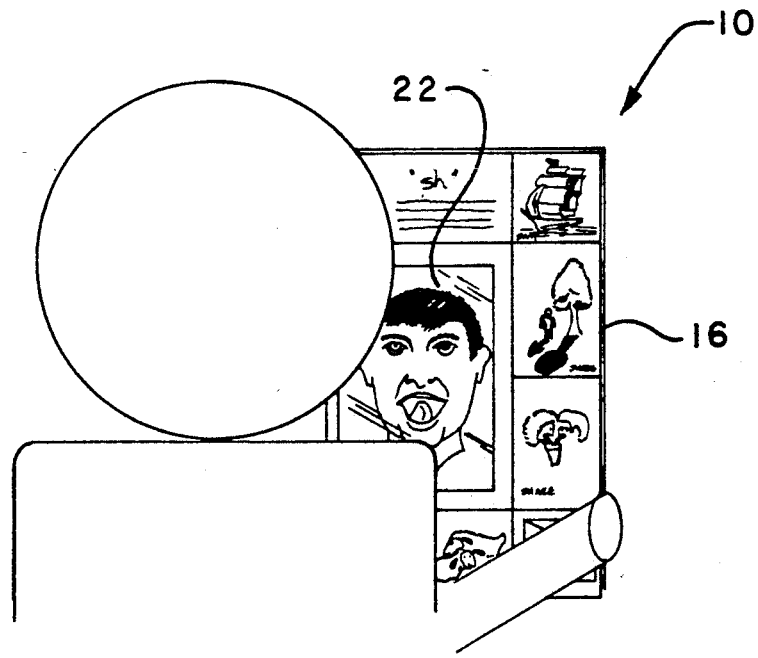
FIG.-5

SPEECH THERAPY DEVICE PROVIDING DIRECT VISUAL FEEDBACK

The present invention relates to a device for improving speech/language problems and disorders by combining teaching and/or instructional indicia with a direct visual feedback means, particularly a mirror centrally mounted on a sheet of stock material surrounded by such teaching and/or instructional indicia.

BACKGROUND OF THE INVENTION

Experts in the profession of speech pathology work with children and adults whose speech or language skills interfere with communication, calls attention to itself and frustrates both speaker and listener. These specialists, called speech-language pathologists ("SLPs"), evaluate and correct defective speech and language and teach new speech and language skills. The field of speech therapy is often called speech pathology and SLPs are sometimes known as speech therapists or speech clinicians. The present invention will help these experts in the rehabilitation of patients.

Speech-language pathologists divide speech and language defects into five main types: 1) articulation problems such as the inability to produce certain sounds; 2) stuttering, cluttering (rapid, slurred speech), and other fluency problems; 3) voice disorders including problems of pitch, voice quality and volume; 4) delayed speech characterized by a child's slow language development; and 5) aphasia, the partial or total loss of the ability to speak or understand language. Speech/language pathologists also treat disorders of swallowing as part of their current scope of practice.

About six percent of the U.S. population have some type of speech or language impairment. Of that group, 60% have articulation problems; 12% have fluency difficulties; and 8% have voice disorders. The remaining 20% have delayed speech, aphasia or multiple speech problems. Some speech defects result from a physical condition such as brain damage, cleft palate, disease of the larynx, partial or complete deafness. Other speech defects may be caused by a person's environment. For example, a child who receives little encouragement to talk at home may not develop normal speech skills. Severe emotional conflicts such as pressure to succeed or a lack of affection, can also lead to speech difficulties.

Speech and language difficulties arise from a variety of physical problems, including, for illustrative purposes only, strokes, cancer of the vocal organs, and birth defects. The method of treatment varies. Speech-language pathologists must consider the age of the patient, the case history, the type of speech or language disorder and other information gained during therapy.

Speech therapy may be given individually or in groups. The purpose of this invention is to supplement the patient's treatment by the professional. This invention will also allow the user to work individually but under the supervision of a SLP.

This invention solves the problem of using a separate mirror or visual feedback means when practicing targeted phonemes or oral exercises displayed on the device, by incorporating the visual feedback means necessary to conduct the exercises. A phoneme is one of the smallest units of speech that serve to distinguish one utterance from another in a language or dialect.

SUMMARY OF THE INVENTION

The present invention, generally stated, provides a means for the treatment of speech problems and disorders. More specifically, the present invention provides a device for convenient use by the patient under the supervision of a speech language pathologist, or SLP.

It is, therefore, an object of the present invention to provide a means for the SLP and the patient to work on speech problems and disorders.

It is also an object of the present invention to establish a routine to work on the exercises.

It is still a further object of the present invention to allow the user to use this invention free from distractions and in a quiet environment.

It is still another object of the present invention to allow the user to work on the exercise while most rested.

These and other objects and advantages of the present invention will become more readily apparent from the more detailed description of the preferred embodiment, taken in conjunction with the drawings.

These and other objects are achieved by a speech therapy device for providing direct visual feedback comprising: a first generally planar surface with a means for providing direct visual feedback affixed to a central portion of the first planar surface and educational indicia printed on a peripheral portion surrounding the central portion; and at least one additional generally planar surface with educational and instructional indicia printed thereon. In a particular embodiment, the device further comprises a first side of a sheet of stock material with opposing first and second generally planar sides, the first planar side constituting the first generally planar surface and the opposing second side constituting the additional generally planar surface. In a further embodiment, the device further comprises a sheet of stock material with opposing first and second generally planar sides, the sheet being folded upon itself to form a folio having first, second, third and fourth pages wherein one of the pages constitutes the first generally planar surface and at least one additional page constitutes the additional generally planar surface. In a yet further embodiment, first and second substantially identical sheets of stock material, each such sheet having opposing first and second generallly planar sides, are affixed along an edge of each sheet to form a folio having first, second, third and fourth pages with one of the pages constituting the first generally planar surface and at least one additional page constituting the second generally planar surface. In any of these embodiments the means for direct visual feedback is a mirror, particularly a reflective material disposed on a transparent sheet. More particularly, the sheet is made from glass or plastic. The sheet is preferably a cardboard having sufficient rigidity to support the mirror. The educational indicia on the first surface comprise a plurality of visual images and instructions for exercising the oral and vocal musculature of the user or at least one illustration of a phoneme and at least two printed words utilizing the phoneme, each word accompanied by an illustration of the concept represented by the word.

BRIEF DESCRIPTION OF DRAWINGS

In order to better understand the present invention, reference is made to the accompanying drawings, wherein:

FIG. 3 is a plan view of an alternate embodiment of the present invention;

FIG. 4 is a perspective view of a third embodiment of the present invention; and FIG. 5 illustrates the present invention in operative use.

DETAILED DESCRIPTION OF THE DRAWINGS

Figure 1:
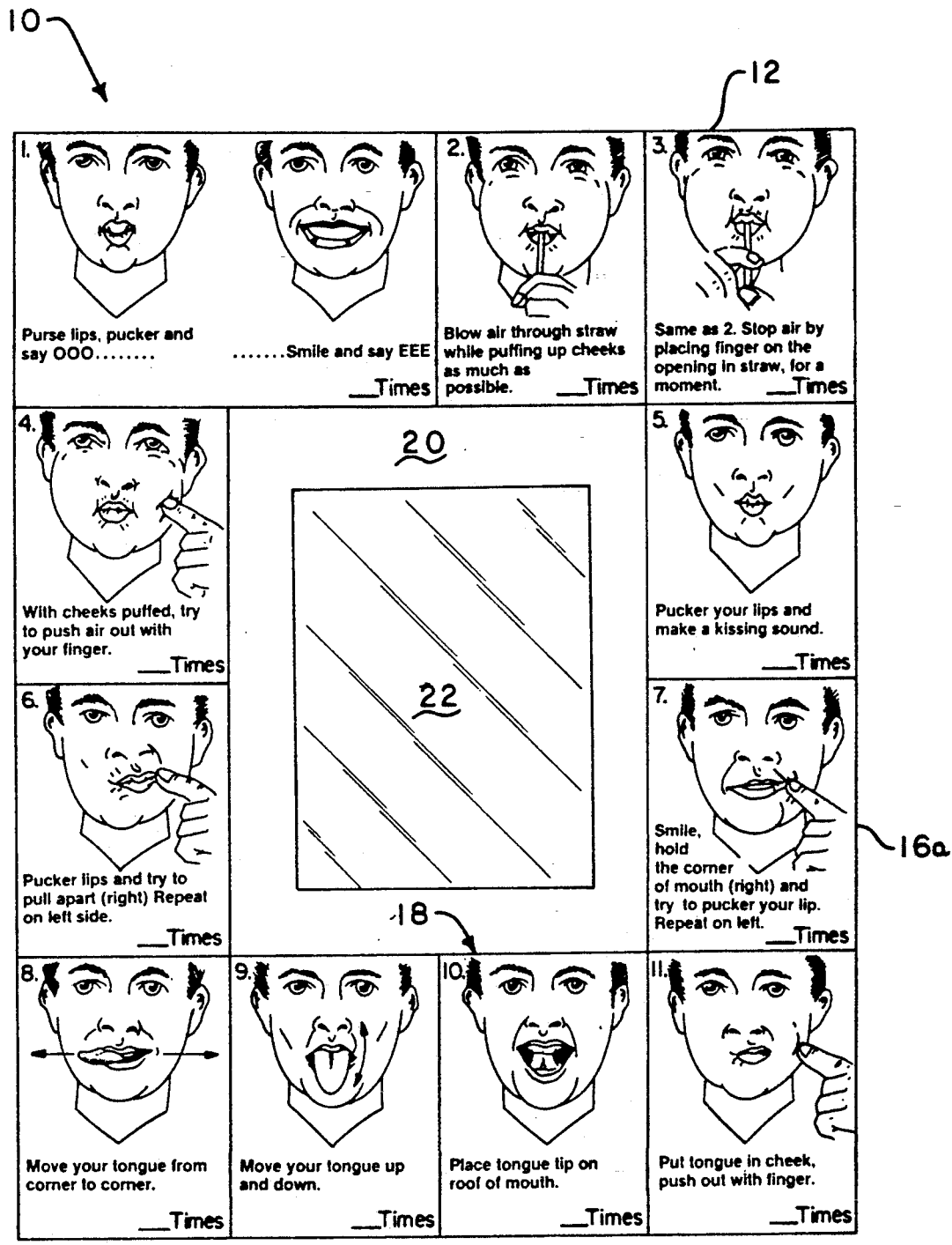
FIG. 1 is a plan view of a first side of the present invention, showing a first type of teaching indicia.

This invention will be described in detail with reference to the preferred embodiments thereof. Like elements are identified by like reference numerals throughout the drawings and specification.

The present invention is a series of innovative practice materials for adults and children. It provides an easy-to-use, convenient format for practicing basic necessary oral exercise drills in a more enjoyable way. The present invention does away with the need for separate visual feedback means, such as a mirror, by incorporating the visual feedback into the practice materials. The present invention contains oral exercises and a mirror or other means for visual feedback, all in one device.

An expert in the field of speech-language pathology would demonstrate to the patient how to use this invention. For example, the SLP would demonstrate to the patient how to form the mouth to produce certain sounds, while looking in a mirror or using other visual means.

It is an important aspect of the device that the color be visually pleasing and easy on the eyes of the user, so that the attention span of the user may be maintained during use. Also, the surfaces of this invention should be of a non-gloss type to aid in the comfort of the user's eyes, as the user focuses on the exercises imprinted thereon. Not only should the surfaces of the device be non-gloss, but the ink used for printing of the exercises and instructions should be easy to read, allowing the user to focus as much energy as possible on the practice of the exercises rather than the reading of the indicia, thus making the sessions more effective and less tiring.

The present invention should be made from at least one sheet of heavy-duty, inexpensive and disposable stock, particularly paper stock. The material should be strong enough to support a visual means such as a mirror. The type of stock material used could be of a cardboard construction. Cardboard is a popular name for any stiff paper or paperboard that is more than 0.006 inch thick.

Other materials may be used that are of a heavy duty, inexpensive and disposable stock, but the preferred material would be cardboard-like material.

A mirror or other visual means must present a clear image for the user, so as to enable the user to see they are forming the right facial expressions and sounds. The visual means must be easily affixed to the heavy duty stock material. This heavy duty stock material must be strong enough to support a visual means and light enough to not become burdensome to the user while the invention is in use. The visual means must be sufficient in size so the user can see their face when practicing the exercises.

Figure 2:
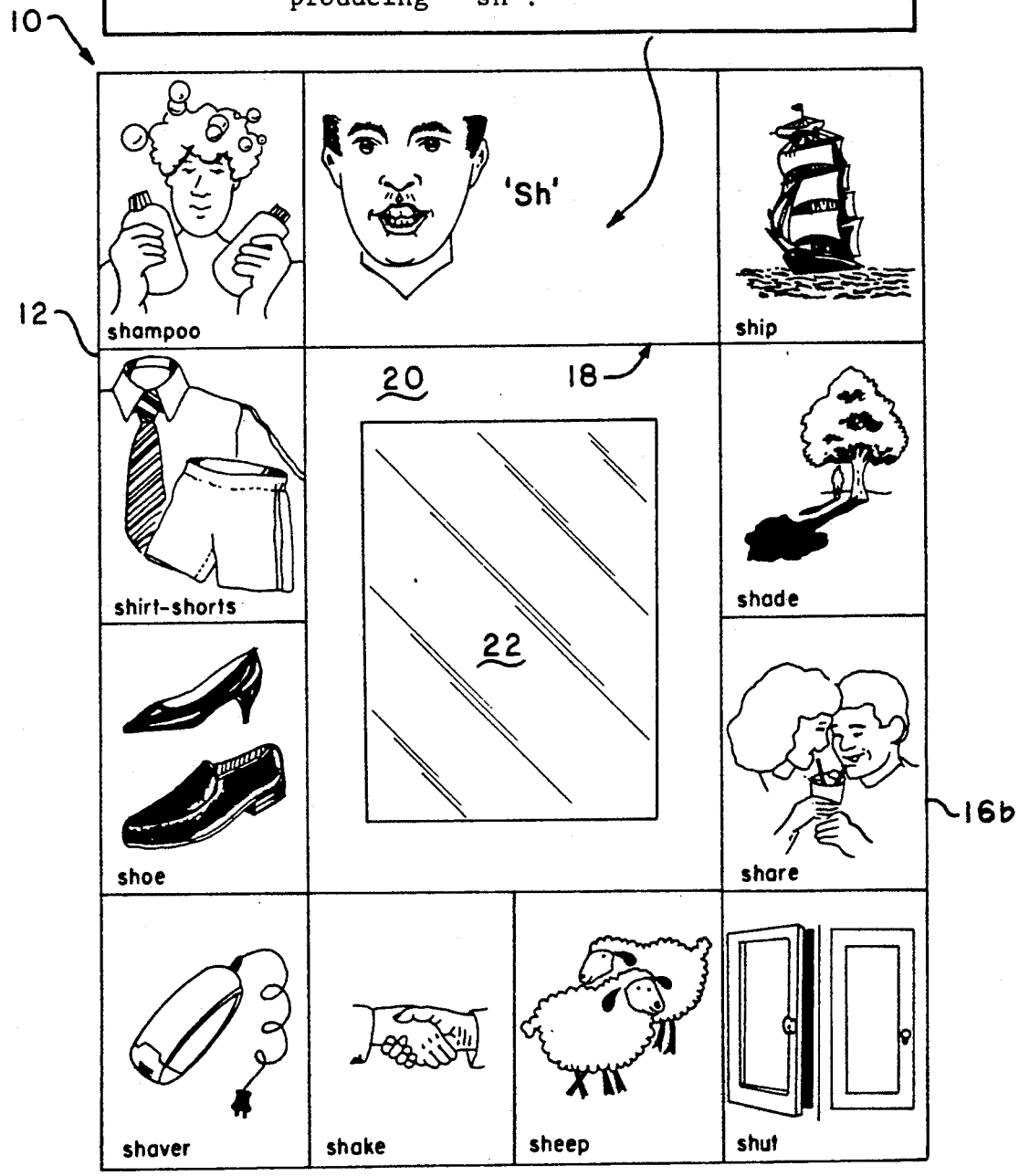
FIG. 2 is a plan view of the first side of the present invention, showing a second type of teaching indicia.

Referring now to FIGS. 1 and 2, a first surface 12 of the present invention 10 is shown in plan view. The device 10 should be sized for the convenience of the user, a particularly convenient size being the rather standard 8½"×11" with the preferred visual means being a 3"×4" acrylic plastic mirror 22 mounted in the center portion 20 of first surface 12 of the present invention 10, but other sizes could be used. Since the device 10 is comprised of a stock material such as cardboard, it has two planar surfaces, 12 and 14, the second side 14 not being shown in FIG. 1. The first surface 12 has a plurality of teaching indicia 16 placed around a peripheral portion 18 of the first side 12. As shown in FIG. 1, a typical example of a first type of teaching indicia 16A would present a variety of exercises for the speech organs of the user, the indicia 16A explaining and illustrating the exercises. These indicia are presented in a plurality of frames, preferably of similar size presented around the visual feedback means 22.

As presented in FIG. 2, a second type of teaching indicia 16B would present a variety of pictures and words directed to a single phoneme, with at least one frame dedicated to instructions for forming the phoneme and illustrating the positioning of the facial speech organs in forming the phoneme. Specifically, FIG. 2 shows teaching indicia 16B targeted on the phoneme "sh".

In the preferred embodiment of invention 10, the second surface 14 of device 10 would also have instructional indicia imprinted thereon, preferably of one of two distinct types. The first type of instructional indicia would give instructions for oral exercises and generally correspond to the teaching indicia of the first type 16A and appear obverse from such teaching indicia 16A, while the second type of instructional indicia would give instructions and additional practices, words, phrases and general suggestions for phoneme exercise, and would generally be used in conjunction with and obverse from the second type of teaching indicia 16B. Since the instructional indicia of either type are predominantly textual, they are perhaps best illustrated as text, and are, therefore, included herein as Examples 1 and 2.

EXAMPLE 1

Oral Exercises—Suggestions for Use

1. Work on the exercises when you are the most rested. Morning and early afternoon tend to be the best times to work.

2. Short sessions are more effective and less tiring. Practice for ___ minutes, ___ times per day.

3. Establish a routine to work on the exercises. Keep in mind this needs to be flexible. Discontinue or postpone an exercise session if you are tired, upset, frustrated or ill.

4. You may find it helpful to use a timer or clock to provide defined limits for home practice sessions.

5. Remember, the best setting for practice is quiet and free of distractions.

6. You and your speech-language pathologist can set practice goals and review them frequently.

Your speech-language pathologist will offer further specific suggestions to help meet your individual needs.

EXAMPLE 2

Speech Exercises—Suggestions for Use

Add words and sentences to those given here with the help of your speech-language pathologist.

| | | |
|---|---|---|
| shall | shortcake | attention |
| shape | shimmer | direction |
| sharp | cashier | permission |
| sherbet | cushion | prescription |

I know a shortcut to Chicago.
It is a nationally known insurance company.
We had strawberry shortcake.
The old men played shuffleboard in the sunshine.
The cashier's addition is poor.
Will you clean the shellac off the paintbrush?
Even in the sunshine we shivered.
The windshield shattered when it was smashed.

The invention 10 is used by a speech-language pathologist to demonstrate to the user during the speech therapy session how to perform the exercises or practice the targeted phoneme. The therapist will demonstrate to the patient how to form the speech organs to produce certain sounds and will have the patient reproduce these sounds while looking in the direct visual feedback means 22.

Although a first embodiment of the invention 10 is a single sheet of stock material having the direct visual feedback means 22 disposed on a first side 12 on a central portion 20 of the sheet, surrounded by educational indicia 16 and with further instructional indicia disposed on the obverse or second side 14 of the sheet, other embodiments of the invention are also possible. Particularly, as shown in FIG. 3, an alternative embodiment would be to take a single sheet of stock material, of the same sort that would be used in the first embodiment, and to fold the sheet along a transverse axis of the sheet, so as to form a folio 40 having four pages, the first and fourth pages 42 and 44 being outer or exterior pages and the second and third pages 46 and 48 being inner or interior pages. With such a folio 40, the means for direct visual feedback 22 could be placed on any of these pages in a central portion thereof, surrounded by the same types of educational indicia as in the first embodiment. This would leave three remaining pages for imprinting further educational or instructional indicia, particularly such instructional indicia as described above in Examples 1 and 2. In one version of this type of embodiment, the first page 42 of the folio 40, that is, the exterior page having the transverse axis fold along the left edge of the page, could be used as the page with the direct visual feedback means. The additional educational and instructional indicia could be placed upon any of the three remaining pages. Another variation on this same product would be to place the direct visual feedback means 22 centrally upon either the second or third pages, 46 or 48, that is, those pages that are interior to the folio 40. The advantage that may be realized from this variation is the placement of the direct visual feedback means 22, most commonly a mirror, on an interior surface so that the shape of the folio 40 itself will provide a cover to the direct visual feedback means 22, somewhat preventing problems of scratching or marking of the direct visual feedback means 22.

In a similar vein, the construction of a folio 50 for the placement of the direct visual feedback means 22 with the surrounding teaching indicia 16 on a single page and instructional indicia on remaining pages may be achieved by the direct affixation or binding of two separate sheets 52 of stock material along a corresponding edge 54, as shown in FIG. 4. In such a manner, the same result as the folio 40 is achieved and some types of binding or affixation means may provide additional flexibility along the spine portion 54 of the folio 50. Clearly, the choice of forming a folio from a single folded sheet of stock material or by affixing to separate sheets of stock material will be well within the ordinary skill level of the typical producer of this product.

When used by a user having a speech problem, the invention 10 can be comfortably held at a proper reading distance from the face, that is, approximately 18 inches or so, and the direct visual feedback means 22 will be large enough at that distance to present an image of a large majority of the face of the user, if not the entire face. By not distracting the user's eye very far from the visual feedback means 22, the user can simultaneously view the ideal positioning of the face, as presented in the teaching indicia 16, and view their own face for direct comparison purposes. This type of direct comparison is not achievable using a standard wall mirror, and the fixed nature of a wall mirror also constrains the user as to their position. The present invention 10 permits use of the training device in a seat, in a bed, or in many other modes.

While in accordance with the patent statutes, the best mode and preferred embodiment of the invention have been described, it is to be understood that the invention is not limited thereto, but rather is to be measured by the scope and spirit of the appended claims.

What is claimed is:

1. A speech therapy device for providing direct visual feedback comprising:
   a first generally planar surface having a means for providing direct visual feedback affixed to a central portion thereof and educational indicia printed on a peripheral portion surrounding said central portion; and
   at least one additional generally planar surface having educational and instructional indicia printed thereon; and
   wherein the educational indicia on the first surface comprise at least one visual image illustrating positioning of the user's facial speech organs and instructions for exercising the oral and vocal musculature of the user.

2. A speech therapy device according to claim 1 wherein the educational indicia on the first surface comprise:
   at least one illustration of a phoneme and
   at least two printed words utilizing the phoneme, each said word accompanied by an illustration of the concept represented by the word.

3. A speech therapy device for providing direct visual feedback comprising:
   a first generally planar surface having a means for providing direct visual feedback affixed to a central portion thereof and educational indicia printed on a peripheral portion surrounding said central portion; and
   at least one additional generally planar surface having educational and instructional indicia printed thereon; and
   wherein the educational indicia on the first surface comprise visual images and instructions for exercising the oral and vocal musculature of the user; and
   said visual images comprising a series of at least two different diagrams whereby each diagram shows the image of a mouth or tongue in at least one predetermined position and said instructions comprising written instructions accompanying each diagram whereby said written instructions explain how the user should position his mouth or tongue to match the position of the mouth or tongue in the diagram.

4. A speech therapy device according to claim 3 wherein a first side of a sheet of stock material having opposing first and second generally planar sides constitutes said first generally planar surface and said opposing second side constitutes said additional generally planar surface.

5. A speech therapy device according to claim 3 wherein a sheet of stock material having opposing first and second generally planar sides is folded upon itself to form a folio having first, second, third and fourth pages;
one said page constituting said first generally planar surface; and
at least one additional said page constituting said additional generally planar surface.

6. A speech therapy device according to claim 3 wherein first and second substantially identical sheets of stock material, each said sheet having opposing first and second generally planar sides, are affixed along an edge of each said sheeet to form a folio having first, second, third and fourth pages;
one said page constituting said first generally planar surface; and
at least one additional said page constituting said second generally planar surface.

7. A speech therapy device according to claim 3 wherein the means for direct visual feedback is a mirror.

8. A speech therapy device according to claim 7 wherein the mirror comprises a reflective material disposed on a transparent glass sheet.

9. A speech therapy device according to claim 7 where the mirror comprises a reflective material disposed on a transparent plastic sheet.

10. A speech therapy device according to claim 9 wherein the transparent plastic sheet comprises an acrylic material.

11. A speech therapy device according to claim 3 wherein stock material comprises cardboard having sufficient rigidity to support the means for providing direct visual feedback disposed thereon.

* * * * *